United States Patent
Henry et al.

(10) Patent No.: US 9,718,944 B2
(45) Date of Patent: Aug. 1, 2017

(54) METHOD OF COLORING BIOCOMPOSITE MATERIALS

(71) Applicant: CNH Industrial Canada, Ltd., Saskatoon (CA)

(72) Inventors: James Henry, Saskatoon (CN); Satyanarayan Panigrahi, Saskatoon (CA); Radhey Lal Kushwaha, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 0 days.

(21) Appl. No.: 14/677,608

(22) Filed: Apr. 2, 2015

(65) Prior Publication Data

US 2016/0289419 A1    Oct. 6, 2016

(51) Int. Cl.
   *C08K 9/00*    (2006.01)
   *C08K 5/00*    (2006.01)
   *C08K 3/00*    (2006.01)
   *C08L 101/00*    (2006.01)

(52) U.S. Cl.
   CPC .......... *C08K 5/0041* (2013.01); *C08K 3/0033* (2013.01); *C08L 101/00* (2013.01)

(58) Field of Classification Search
   CPC .............. D01G 15/02; C08L 1/02; D01B 1/10
   See application file for complete search history.

(56) References Cited

U.S. PATENT DOCUMENTS

| | | |
|---|---|---|
| 3,597,150 A | 8/1971 | Cappotto |
| 3,619,356 A | 11/1971 | Keen |
| 3,743,477 A | 7/1973 | Egli et al. |
| 4,082,502 A | 4/1978 | Von Der Eltz et al. |
| 4,245,992 A | 1/1981 | Yamashita et al. |
| 4,265,629 A | 5/1981 | Ribka et al. |
| 4,599,087 A | 7/1986 | Heller et al. |
| 4,737,156 A | 4/1988 | Tambor et al. |
| 4,740,214 A | 4/1988 | McBride et al. |
| 4,851,458 A | 7/1989 | Hopperdietzel |
| 4,891,096 A | 1/1990 | Akkawi |
| 5,221,288 A | 6/1993 | Kamada et al. |
| 5,353,706 A | 10/1994 | Kerle |
| 5,372,747 A | 12/1994 | Uhrig et al. |
| 5,705,120 A * | 1/1998 | Ueno .............. C08K 7/06 264/122 |
| 5,891,201 A | 4/1999 | Enderlin et al. |
| 5,944,852 A | 8/1999 | Lin et al. |
| 6,635,347 B1 | 10/2003 | Yoshida |
| 2003/0004233 A1 | 1/2003 | Yamaguchi et al. |
| 2004/0076847 A1 | 4/2004 | Saunders et al. |
| 2005/0136228 A1 | 6/2005 | Marini et al. |
| 2008/0119589 A1 | 5/2008 | Majewski et al. |
| 2008/0145637 A1 | 6/2008 | Frank |
| 2008/0189879 A1 | 8/2008 | Garcia Espino et al. |
| 2009/0035573 A1 | 2/2009 | Rajarman et al. |
| 2009/0306253 A1 | 12/2009 | Hansen et al. |
| 2010/0273929 A1 | 10/2010 | Kitagawa et al. |
| 2014/0053348 A1 | 2/2014 | Finley |
| 2014/0099497 A1 | 4/2014 | Panigrahi et al. |
| 2014/0100332 A1 | 4/2014 | Henry et al. |

FOREIGN PATENT DOCUMENTS

| | | |
|---|---|---|
| CN | 103952927 | 7/2014 |
| JP | 2007247116 | 9/2007 |
| WO | 9853127 | 11/1998 |
| WO | 2008039153 | 4/2008 |
| WO | 2010064086 | 6/2010 |

OTHER PUBLICATIONS

Aspland, "The Coloration and Finishing of Nonwoven Fabrics", School of Materials and Engineering Clemson University, Jun. 2005, 28 pages.
PCT/IB2015/000612, International Search Report and Written Opinion, dated Dec. 23, 2015, 10 pages.

\* cited by examiner

*Primary Examiner* — Hannah Pak
(74) *Attorney, Agent, or Firm* — Rebecca L. Henkel; Rickard K. DeMille

(57) ABSTRACT

A method for coloring fibers or fibrous materials where the fibrous material is initially chemically pretreated in order to achieve natural/white color for the fibrous materials. Next the pretreated fibrous material, a polymer base, and the colorant concentrate(s) are combined under suitable conditions to form a biocomposite mixture. The chemical pretreatment of the fibrous material prevents damage from being done to the fibrous material, such that the fibrous material retains its strength enhancing properties when combined with the polymer to form the biocomposite mixture. Additionally, the chemical pretreatment enables the fibrous material to chemically and mechanically bond with the colorant when combined into the biocomposite mixture.

11 Claims, 1 Drawing Sheet

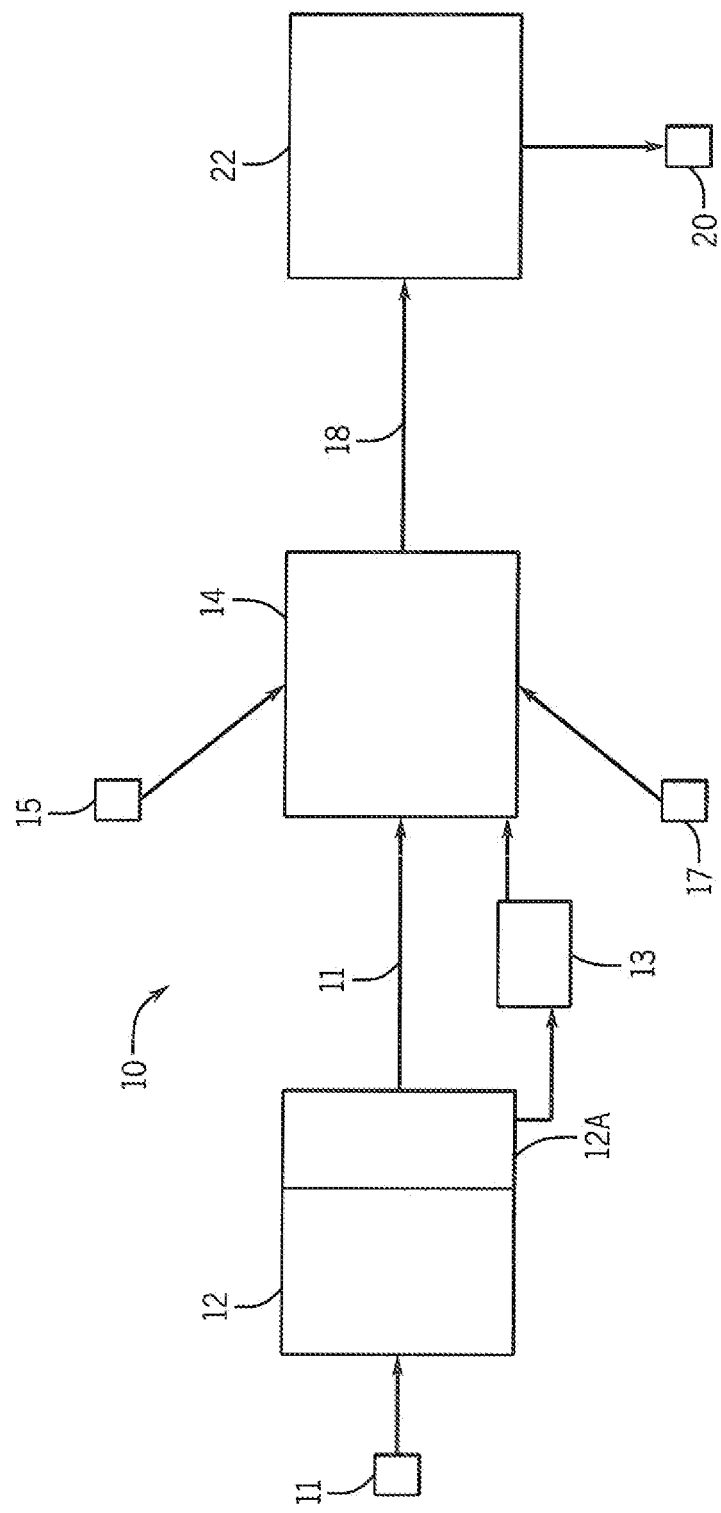

METHOD OF COLORING BIOCOMPOSITE MATERIALS

FIELD OF THE INVENTION

The subject matter disclosed herein relates generally to biocomposite materials and, in particular, to a method and system to provide desired colors to biocomposite materials.

BACKGROUND OF THE INVENTION

Fibrous materials such as straw from flax, sisal, hemp, jute and coir, banana, among others, are used or combined with various polymers in the formation of biocomposite, or bio-fiber composite materials. Biocomposite materials utilizing these fibrous materials or fibers mixed with selected polymers provide enhanced desirable properties, such as increased strength, to the biocomposite material compared with polymer-only materials.

However, when the biocomposite material is formed, it is often desired to color the biocomposite material due to the particular use or product into which the biocomposite material is formed. Colorants are used in these biocomposite materials in order to increase the brand identity and aesthetic appeal of the products made from these materials. To accomplish this various colorants are utilized. These colorants are intermixed with the biocomposite material and provide the biocomposite material with the desired color for the end use of the biocomposite material. In one example of the use of colorants with biocomposite materials, these materials are colored by pre-coloring the fibrous material with liquid colorant before combining the fibrous material with the polymer base to form the biocomposite material. For example, the fibrous material and colorant are placed within a suitable container and boiled in order to bond the colorant to the fibrous material.

However, a significant problem with coloring bio-fiber composite materials is that the fibrous material, e.g., the cellulose material, interacts with the colorant differently than the polymer component of the biocomposite material resulting in an inconsistent finish/coloration over the entirety of the product formed with the biocomposite material and colorant.

Further, traditional methods for introducing the colorant into the biocomposite material, such as boiling, can damage the fibrous material, which can significantly degrade the strength of the fibrous material. This can result in the fibrous material acting within the biocomposite material as a filler material instead of a strength-enhancer.

As a result, it is desirable to develop an improved method for adding or introducing a colorant into a biocomposite formed with a fibrous material and polymer base in that provide a uniform color finish over the entire biocomposite material product, while not detrimentally affecting the strength/reinforcement properties of the fibrous material in the biocomposite.

SUMMARY OF THE INVENTION

According to one aspect of an exemplary embodiment of the invention, a method is provided to add a colorant to a biocomposite material that provides a uniform color across the entirety of the biocomposite material. In the method, the fibers or fibrous materials are initially chemically pretreated in order to achieve natural/white color for the fibrous materials. Next the pretreated fibrous material, a polymer base, and the colorant concentrate(s) are combined under suitable conditions to form a biocomposite mixture. This biocomposite mixture is then compounded to thoroughly mix the components. The colored biocomposite mixture is subsequently formed into pellets, which can be utilized in various thermoplastic processing technologies, such as extrusion, injection molding, compression molding, rotational molding, among other suitable processes, to create a thermoformed biocomposite product. The chemical pretreatment of the fibrous material prevents damage from being done to the fibrous material, such that the fibrous material retains its strength enhancing properties when combined with the polymer to form the biocomposite mixture. Additionally, the chemical pretreatment enables the fibrous material to chemically and mechanically bond with the colorant when combined into the biocomposite mixture.

According to another aspect of an exemplary embodiment of the invention, the method requires only a single step in order to bond the colorant to the fibrous material, making the method less labor intensive than prior art processes.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawing furnished herewith illustrates an exemplary embodiment of the present invention in which the above advantages and features are clearly disclosed as well as others which will be readily understood from the following description of the illustrated embodiment.

In the drawing:

The FIGURE is a schematic illustration of an exemplary embodiment of a biocomposite material coloring method performed according to the present disclosure;

DETAILED DESCRIPTION OF THE INVENTION

With reference now to the drawing FIGURE in which like reference numerals designate like parts throughout the disclosure, an exemplary embodiment of a method 10 for coloring biocomposite materials formed of combinations of various types of fibrous materials and polymers is illustrated.

In the illustrated embodiment, the method 10 includes an initial step 12 of pretreating the fibrous material 11 for use in the biocomposite. The fibrous material 11 can be selected from any suitable fibrous material used in the formation of biocomposites, and in an exemplary embodiment is a cellulosic based fibrous material such as oilseed flax, fiber flax, industrial hemp, coir, jute, banana, and sisal, among others.

In the pretreatment step 12, the fibrous material which decorticated through the combing process where molecules of the cellulose fibers are not stressed, e.g., such as by those systems and methods disclosed in co-pending and co-owned U.S. Non-Provisional patent application Ser. No. 13/648,738, filed on Oct. 12, 2012, the entirety of which is expressly incorporated by reference herein in its entirety. For example, in the pretreatment step 12 the cellulose fibers are not separated from the other components of the fibrous material 11 by hammer mills, where the cellulose fiber molecules are stressed and compressed mechanically, and it is difficult to remove all of the lignin without damaging the cellulose fiber quality. In doing so, the fibrous material 11 is placed within a suitable enclosure and then chemically modified by alkaline treatment, e.g., in a solution of sodium hydroxide at a concentration 1-10% w/w, for a residence time of 1-24 hours, as necessary, followed by hydrogen peroxide treatment, e.g., in a solution including hydrogen peroxide at a concentration of 4-10% w/w hydrogen peroxide and sodium silicate at a concentration of 0.5-5% w/w, for a residence time of 1-10 hours, as necessary, to remove the color causing group from the cellulose fibers or by using sodium hydrosulfite which eliminates the color causing group from the fibers. This treatment helps to increase the aspect ratio of fiber, increase the interlocking capacity of fiber, while consequently reducing the weight and diameter of the fibers.

After this initial component of the pretreatment step 12, the cellulose fibers are cleaned with distilled water to remove all chemicals and modified in a suitable treatment step 12A to provide better mechanical and molecular bonding of the biocomposite material with colorant/pigment. In general, the addition of a colorant/pigment to a biocomposite material reduces the strength of the biocomposite. This modifying treatment step 12A protects the mechanical properties of the composite. One example of a step 12A of this type is by modifying the cellulose fibers with a triethoxyvinylsilane solution having triethoxyvinylsilane present in a concentration of 1-6% w/w, with the remainder being a mixture of water and alcohol in a ratio of between (40-60):(60-40)% w/w, for a residence time of between 1-6 hours, as necessary. After the triethoxyvinylsilane treatment the cellulose fibers are again cleaned with distilled water to remove all chemicals and optionally or subsequently dehumidified in step 13, such as by utilizing the device and method disclosed in co-owned and co-pending U.S. Non-Provisional patent application Ser. No. 14/640,500, filed on Mar. 6, 2015, the entirety of which is expressly incorporated by reference herein, to remove all moisture from the fiber without destroying the fiber quality to ultimately produce a cellulose fiber is bright and whitish in color.

Once the fibrous material 11 is pretreated in this manner to achieve the desired natural or white color for the fibrous material 11 and output from step 12, in step 14 the pretreated fibrous material 11 is compounded with the selected and suitable polymer(s) 17 and the colorant 15 in a suitable compounding device to form the colored biocomposite material, for example by using those steps disclosed in co-owned and co-pending U.S. Non-Provisional patent application Ser. No. 14/087,326, filed on Nov. 22, 2013, the entirety of which is expressly incorporated by reference herein.

In the biocomposite formation/compounding step 14, an amount of the desired colorant 15 is added to the device holding the fibrous material 11 and the polymer 17, such that the process for forming the colored biocomposite material 16 can be achieved in a single step, without having to color the fibrous material in a separate and independent step. With regard to the colorant 15, any suitable type of natural, synthetic, and food/medical/industrial grade colorant can be used in this process. Further, the colorant can be in liquid or powder form without affecting the quality or coloration of the biocomposite material 18 and any end product 20 formed in a suitable thermoforming process 22 from the material 18. The end product 20 can be formed from pellets (not shown) of the biocomposite material 18 output form the compounding step 16 and input into the selected thermoforming process 22. For example, if white biocomposite material is required, then the process of the biocomposite formulation includes the addition of one or more of zinc oxide/titanium dioxide in an amount of 0.5-5% w/w to the biocomposite material is employed to get a white biocomposite. In addition, these chemicals enhance the bonding between cellulose fiber and the selected polymer and enhance the strength of the biocomposite, while also rendering the biocomposite non-porous and improving the moisture and UV resistance of the biocomposite. Similarly any other suitably colored pigments as are known in the art can be added to the biocomposite material, for example in amounts of 0.5-3% w/w, to achieve the required biocomposite color.

In the mixing and/or compounding step 16, as the fibrous material has natural/white color when introduced, no color manipulation is required. In other words, a colorant having the desired color for the biocomposite material/end product can be used directly in this step, instead of mixing colorants with different colors to account for the grey/brown color of the fibrous material utilized in prior art coloring processes. In the compounding step 16, the fibrous material completely blends in with the polymer base once colored with the colorant. Further, there is no leaching of colorant out of the biocomposite material once formed due to the mechanical and chemical bonding that occurs between the colorant and fibrous material as a result of the chemical pretreatment of the fibrous material, allowing the biocomposite material 18 to be used to from products 20 for use in the agricultural, automotive, construction and packaging industries, among others.

In addition, because the illustrated exemplary embodiment of the method of the invention does not involve processes that can damage or otherwise detrimentally affect the physical properties of the fibrous material, such as the prior art step of boiling of the fibrous material to color the fibrous material, the reinforcement properties of cellulose material are maintained. Further, any swelling of the fibrous material is minimized during coloring process of the illustrated exemplary embodiment of the invention, and the fibrous material is not placed under any thermal stress in the process, as opposed to traditional coloring processes that require heat, i.e., boiling, for the colorant and fibrous material to bond, which consequently reduces the strength of the fibrous material.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:
1. A method for coloring fibrous materials for use in the formation of a biocomposite material, the method consisting of the steps of:
   a) pretreating the fibrous material to achieve a natural or white color for the fibrous material; and b) mixing a colorant with the pretreated fibrous material to color the fibrous material, wherein the colorant is selected from the group consisting of a natural, and synthetic colorant.

2. A method for coloring fibrous materials for use in the formation of a biocomposite material, the method comprising the steps of:
   a) pretreating the fibrous material to achieve a natural or white color for the fibrous material; and
   b) mixing a colorant with the pretreated fibrous material to color the fibrous material, wherein the step of mixing the colorant with the pretreated fibrous material does not require heat.

3. The method of claim 2 wherein the step of mixing the colorant with the pretreated fibrous material does not require color manipulation.

4. The method of claim 2 wherein the step of mixing the colorant with the pretreated fibrous material comprises adding the colorant directly to the pretreated fibrous material.

5. The method of claim 2 wherein the step of mixing the colorant with the pretreated fibrous material mechanically and chemically bonds the colorant to the fibrous material.

6. The method of claim 2 wherein the step of mixing the colorant with the pretreated fibrous material causes the pretreated fibrous material to swell.

7. A method for forming a biocomposite material consisting of the steps of:
   a) coloring the colored fibrous material according to claim 2; and
   b) mixing a polymer with the pretreated fibrous material and the colorant.

8. A biocomposite material consisting of fibrous colored fibrous material obtained by the method of claim 7.

9. A product consisting of the biocomposite material formed by claim 7.

10. The method of claim 7 wherein the steps of coloring the fibrous material and mixing the polymer are performed simultaneously.

11. A method for coloring fibrous materials for use in the formation of a biocomposite material, the method consisting of the steps of:
   a) pretreating the fibrous material with sodium hydroxide to achieve a natural or white color for the fibrous material; and
   b) mixing a colorant with the pretreated fibrous material to color the fibrous material.

* * * * *